US005244339A

United States Patent [19]

Normand

[11] Patent Number: 5,244,339

[45] Date of Patent: Sep. 14, 1993

[54] METHOD FOR THE PICKUP AND DISTRIBUTION OF PARCELS IN AN URBAN ENVIRONMENT

[76] Inventor: Jean Normand, 27, rue Charron, 93300 Aubervilliers, France

[21] Appl. No.: 759,037

[22] Filed: Sep. 5, 1991

Related U.S. Application Data

[63] Continuation of Ser. No. 467,986, Jan. 22, 1990, abandoned.

[30] Foreign Application Priority Data

Jan. 25, 1989 [FR] France ................................ 89 00899

[51] Int. Cl.$^5$ ................................ B65G 67/02

[52] U.S. Cl. ................................ 414/786; 414/555

[58] Field of Search ............... 414/786, 498, 546, 547, 414/550, 555, 332; 108/55.1, 55.3, 55.5; 220/1.5, 23.2

[56] References Cited

U.S. PATENT DOCUMENTS

| | | | |
|---|---|---|---|
| 2,923,512 | 2/1960 | Campbell | 108/55.5 |
| 3,015,407 | 1/1962 | Fesmire et al. | 220/1.5 |
| 3,139,198 | 6/1964 | Penney et al. | 414/550 |
| 3,239,080 | 3/1966 | Corompt | 414/546 X |
| 3,253,716 | 5/1966 | Stratton | 414/550 X |
| 3,480,174 | 11/1969 | Sherwood | 220/1.5 |
| 3,776,169 | 12/1973 | Strecker | 220/23.6 X |
| 3,830,457 | 8/1974 | Stewart | 52/23 X |
| 3,943,670 | 3/1976 | Miller | 52/23 |
| 4,068,426 | 1/1978 | Warren | 52/23 X |
| 4,078,818 | 3/1978 | Donnelly | 414/498 X |
| 4,327,529 | 5/1982 | Bigelow, Jr. et al. | 52/143 X |
| 4,390,314 | 6/1983 | Oberg | 414/547 |
| 4,416,413 | 11/1983 | Chester | 232/24 |
| 4,501,098 | 2/1985 | Gregory | 52/143 X |
| 4,571,141 | 2/1986 | Gieson | 108/55.1 X |
| 4,936,735 | 6/1990 | Ryan | 414/498 X |
| 4,984,962 | 1/1991 | Järvinen | 414/498 X |

FOREIGN PATENT DOCUMENTS

| | | | |
|---|---|---|---|
| 2322657 | 11/1974 | Fed. Rep. of Germany | 414/547 |
| 3546070 | 7/1987 | Fed. Rep. of Germany | 414/550 |
| 2261206 | 9/1975 | France . | |
| 738923 | 6/1980 | U.S.S.R. | 414/546 |
| 1186538 | 10/1985 | U.S.S.R. | 414/546 |
| 1212881 | 2/1986 | U.S.S.R. | 414/546 |
| 1344643 | 10/1987 | U.S.S.R. | 414/555 |

*Primary Examiner*—David A. Bucci

*Attorney, Agent, or Firm*—Schweitzer Cornman & Gross

[57] ABSTRACT

A method and apparatus for the distribution and collection of parcels to multiple destinations in an urban environment is effected through the use of a "mini-warehouse" modular container which may be delivered during low traffic hours in the early morning or late evening to a curbside site for filling or emptying of parcels during normal daylight hours. Thereafter the container may be removed from that curbside site after emptying or filling at a very late or very early hour in which vehicular traffic is nil. The apparatus is essentially a parallelpiped "mini-warehouse" which container having an access door, may be parked at curbside in a space generally that of a single motor vehicle. Other motor vehicles are prohibited from parking in the space by appropriate structure which prevents vehicular parking on the support for the "mini-warehouse" container.

2 Claims, 3 Drawing Sheets

METHOD FOR THE PICKUP AND DISTRIBUTION OF PARCELS IN AN URBAN ENVIRONMENT

This is a continuing application of U.S. Ser. No. 467,986, filed on Jan. 22, 1990, now abandoned.

BACKGROUND OF THE INVENTION

The present invention relates to a new method for the pickup and distribution of parcels in an urban environment and to an apparatus for the employment of this method.

The distribution of parcels in cities involves traffic problems that are particularly difficult to resolve.

Small-capacity vehicles are generally used on this account, which increase the volume of traffic and which have to park in order to load and unload their parcels, and this interrupts traffic.

Attempts have also been made to perform the deliveries outside of the heavy-traffic hours, but this has limits due to the fact that the persons who are to receive or ship the parcels are not generally present except during working hours.

The present invention permits resolving these difficulties with the aid of simple, inexpensive means which are easy to realize.

SUMMARY OF THE PRESENT INVENTION

The present invention has as its subject matter a method for the distribution of parcels in an urban environment, characterized by the fact that the parcels are sorted to distribute them according to the areas of their destination; the parcels intended for an area are placed in a closed container which is provided with at least one door and the dimensions of which are such that it can easily be loaded and unloaded from a vehicle; the container thus loaded is brought, preferably during hours of lighter traffic, to the area where the parcels it contains are to be distributed; the container is placed on a means of support designed to receive it, after which the vehicle that carried it can be released; and, with the aid of means which can be moved about manually at the curb, such as a hand truck or dolly, the parcels contained in the container are delivered.

According to a preferred embodiment of the invention, containers are used which occupy a floor area corresponding substantially to that of a car, these containers being able easily to be transported on a pickup truck which can load them and unload them with the aid of an independent lifting means.

According to a preferred embodiment of the invention, the support means designed to hold the container is raised above the floor or has posts so as to prevent vehicles from parking on the support means when the latter is not being used in accordance with the invention.

The support means intended for holding the containers are advantageously placed along a curb where they take up substantially as much parking space as a car, which is less of a nuisance to traffic than the methods of delivery presently in use.

The present invention likewise has as its subject matter an apparatus designed to employ the method described above, this device being characterized by the combination of a container provided with at least one door, adapted to be placed on a vehicle, and a support means fastened to the ground or roadway on which the container is to be held.

In a preferred embodiment the container is equipped on its upper part with a hook means by which it can be moved about.

In a preferred embodiment of the invention, the support means and the container are provided with cooperating lock means making it impossible to remove the container from its support by unauthorized persons.

In one advantageous embodiment the support has guidance means to facilitate the correct positioning of the container.

In one particular embodiment of the invention the containers are stackable and can be locked onto one another.

It is quite evident that the method and the apparatus that have been described above with reference to the delivery of parcels in city areas can just as easily be used for the collection of parcels, the latter being progressively stored in the container to which they are brought by manual means, the container being then removed by a vehicle, after which the parcels follow their normal route of transport and distribution.

To enable the invention to be better understood and to describe other features thereof, a description will now be given by way of explanation, but without restrictive intent, of one embodiment taken as an example and represented in the appended drawing.

DESCRIPTION OF THE DRAWINGS

In FIG. 1 can be seen a light vehicle 1 equipped with a hydraulic crane 2 supporting a container 3 placed on its platform 4. Also diagrammatically represented is a hook means 5 affixed to the upper part of the container so that the latter can be grasped by the hook 6 of the crane 2.

FIG. 2 shows diagrammatically how a container 3 provided with its hook means 5 and doors 6 and 7 can be placed on the roadway 8 along-side a curb 9, on a support means 10 defined at each corner by abutments 11 whose rounded shapes serve to guide the container as it descends.

In FIG. 2, the doors 6 and 7 have been shown on the visible faces of the container, but it is clear that the latter can be oriented differently, for example by placing the door 7 on the curb side if there is no other door on that side.

In FIG. 3 is shown a variant of the container support of FIG. 2 wherein this device 10 is raised to a height corresponding substantially to that of the curb 9, so as to prevent cars from parking at the location to be occupied by a container.

According to a preferred embodiment of the invention, a latch means fastens the container on its support means.

This latch means can be constituted, for example, by lugs integral with the container and projecting horizontally outward to engage in corresponding openings on the support means.

According to a preferred embodiment, the latch means opens automatically when the container is raised by the hook means 5. A lock operated by a key or a code can prevent unlatching by any person unauthorized to operate the apparatus according to the invention.

Figure 1:
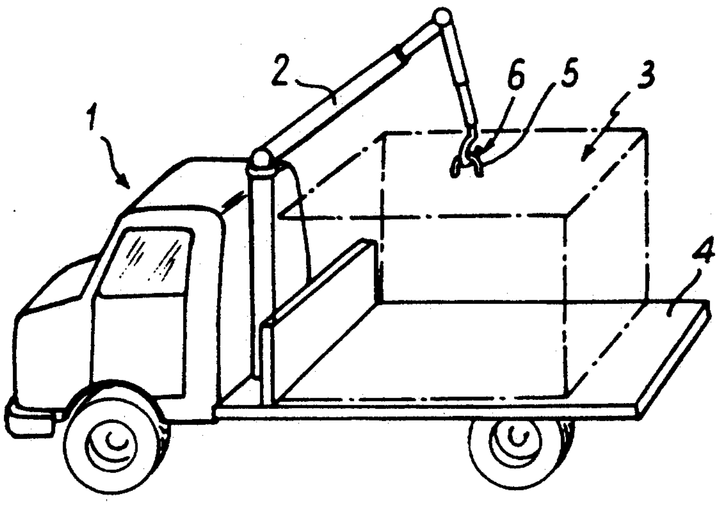
FIG. 1 is a perspective view of a pickup truck for transporting a container.
Figure 2:
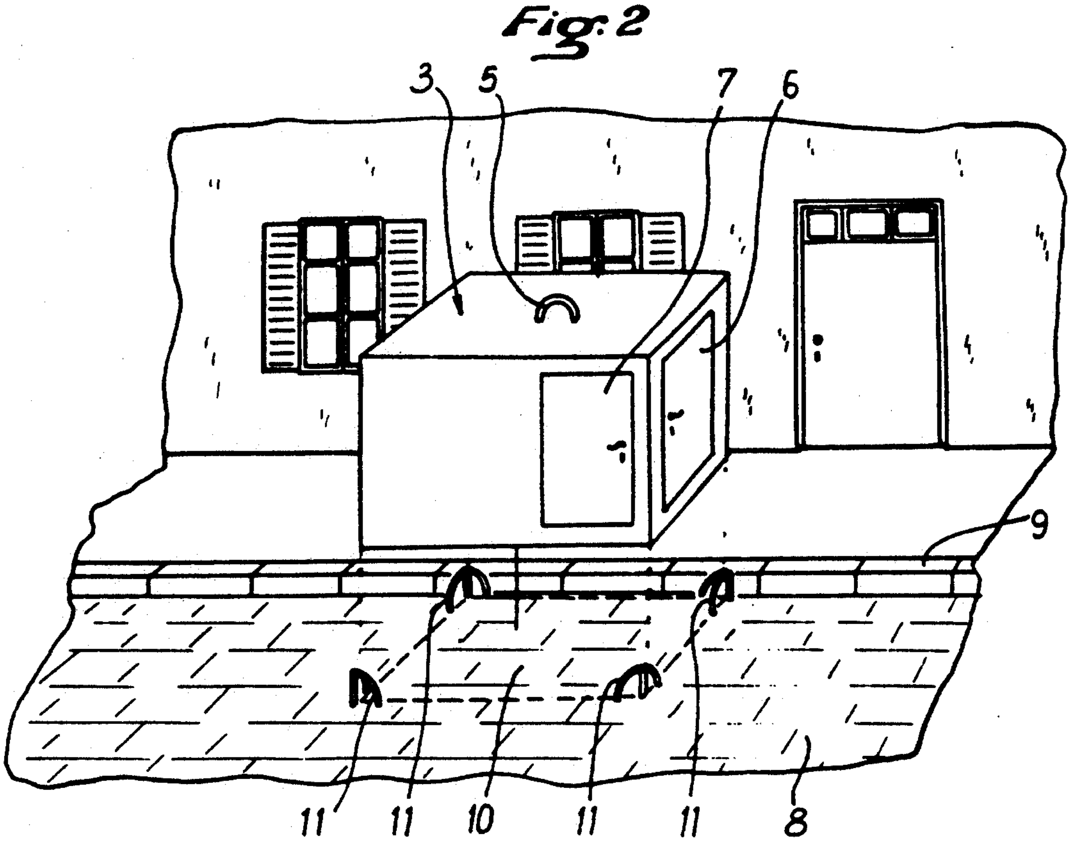
FIG. 2 is a diagrammatic perspective view showing a container being placed on its support.
Figure 3:
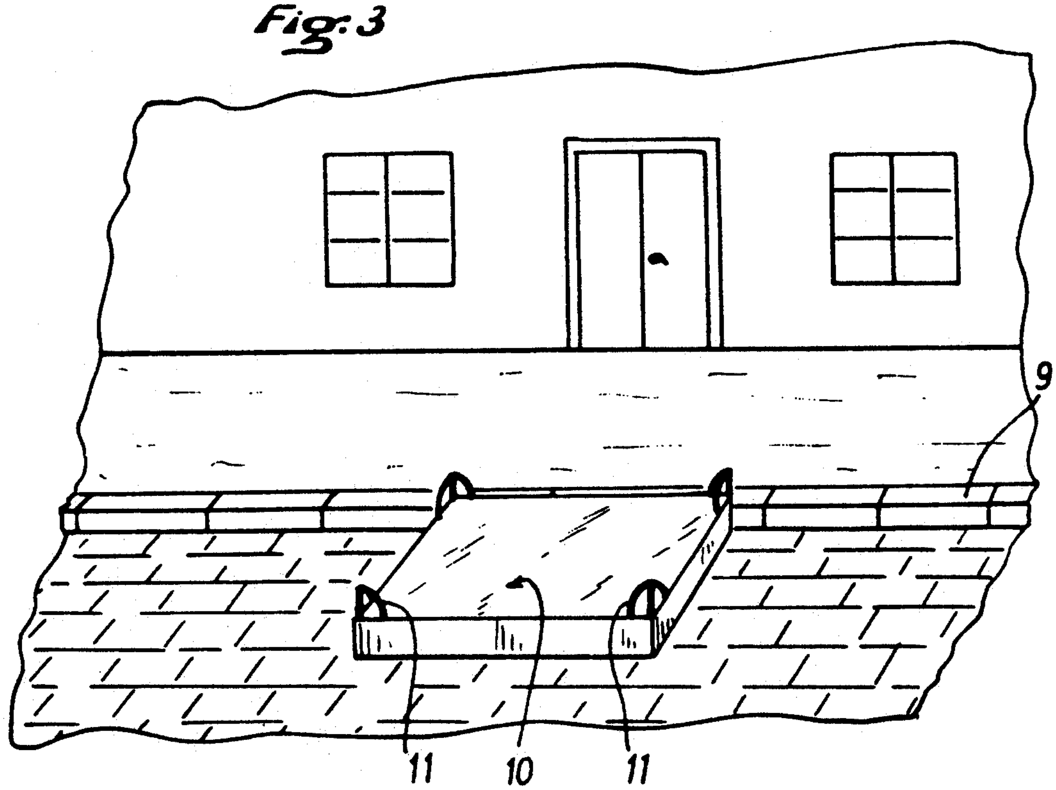
FIG. 3 is a perspective view showing a variant support.
Figure 4:
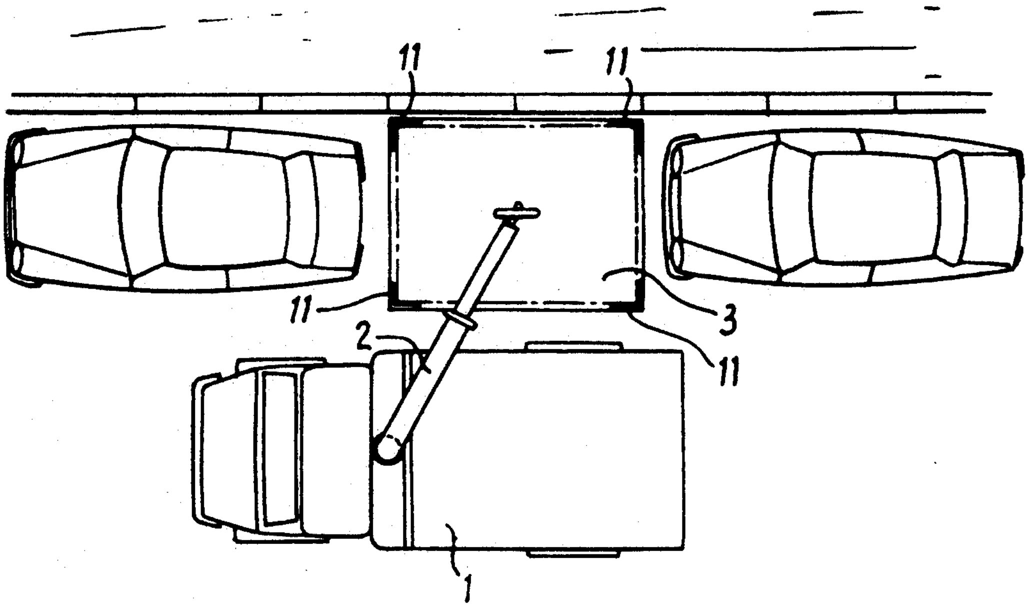
FIG. 4 is a top view showing how the truck can load or unload a container between two parked vehicles by means of its independent lifting apparatus.

Lastly, FIG. 4 shows how the pickup truck 1 can use its crane 2 to set in place and remove a container 3 despite the presence of cars parked right close to the container support means.

In accordance with the invention, it is advantageous to use stackable containers, which if desired can be fastened together by the latch means used to fasten them to the support means. This feature can be particularly useful for the storing and transport of the containers.

It can be seen that, in accord with the invention, it is possible with the aid of inexpensive equipment to carry on the picking up and distribution of parcels in an urban environment without substantially interfering with traffic.

Figures 5, 6:
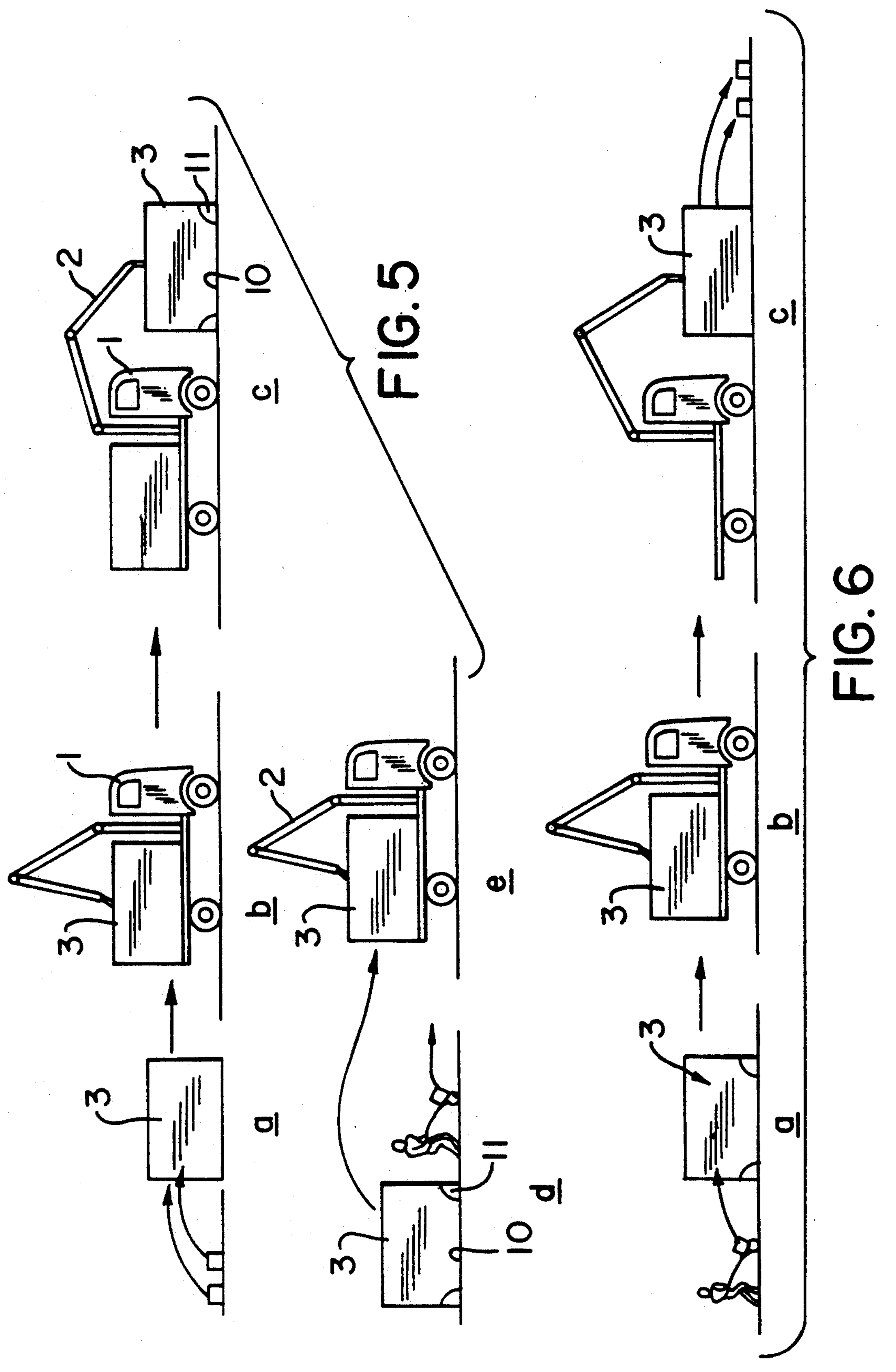
FIG. 5 is schematic illustration of the method of distributing parcels in accordance with the principles of the invention.
FIG. 6 is a schematic illustration of the method for collecting parcels in accordance with the principles of the invention.

The schematic of FIG. 5 represents the method of the invention in which reference character a depicts the placement of sorted parcels into the container; b represents the loading of the container on the vehicle for traveling to the general area where the parcels are to be distributed; c represents the unloading of the container from the vehicle and placement of the container on the support means 10 on the curbside; d represents the unloading of the container and delivery of the sorted parcels to their ultimate destinations, and e represents the loading of the emptied container 3 onto a vehicle for return to a main center for reloading of pre-sorted parcels for delivery to another urban area. FIG. 6 represents the method of collecting parcels in an urban area in which a depicts the placement of parcels to be collected in the container 3; b represents loading the container 3 onto a vehicle for transport back to central location, and c represents the step of unloading the collected parcels from the container at that central location.

It is particularly interesting to note that the vehicles used in the off-hours to move the containers are conventional vehicles which can be used for other purposes the rest of the time.

It is well understood that the embodiments that have been described are in no way restrictive, and that they can undergo any desirable modifications without thereby departing from the scope of the invention.

In particular, the vehicles used can be not only pickup trucks but also trucks of larger size.

Likewise, the loading and unloading of the containers according to the invention can be performed with an independent hoisting engine mounted, for example, on a vehicle especially created for this purpose. Needless to say, the hoisting engine also can be of the hydraulic or other type, such as electrical or mechanical, for example.

Lastly, it is clear that the pickup and distribution procedures according to the invention can be combined and performed together.

I claim:

1. A method for the distribution of parcels to myriad ultimate destinations in multiple areas of an urban environment comprising:

(a) sorting the parcels at a central location into a series of groups each group corresponding to one of the areas of their particular ultimate destinations;

(b) assembling and storing each of the groups of sorted parcels to be distributed in a series of a closed mini-warehouse containers, at least one for each area, said containers having at least one door, and being capable of being easily hoisted onto and unloaded from a vehicle by way of a hoist on said vehicle;

(c) loading said mini-warehouse containers on vehicles having said hoist;

(d) transporting said mini-warehouse containers to each of said particular destinations where the sorted parcels are to be distributed;

(e) unloading said containers from said vehicles by said hoist; and (f) establishing curbside support means adapted to receive said containers at a curbside location in each of said areas, said curbside support means including abutment means for guiding the containers onto said curbside support means;

(g) parking said containers at curbside locations in each of said areas;

(h) delivering all the sorted parcels contained in said parked containers to their ultimate destinations within each of said areas and thereby emptying the containers; and (i) unparking and removing the empty containers and placing each on a vehicle, thereby preparing each of said support means for the subsequent receipt of another filled container.

2. A method according to claim 1, including the further step of (a) physically prohibiting vehicles from parking on or interfering with said support means prior to delivery and parking of a container thereupon.

* * * * *